(12) United States Patent
Alizadeh-Shabdiz

(10) Patent No.: US 9,001,743 B2
(45) Date of Patent: *Apr. 7, 2015

(54) INCREASING THE ACCURACY OF LOCATION ESTIMATES FOR WIRELESS LOCAL AREA NETWORK (WLAN) AND CELLULAR ENABLED DEVICES

(71) Applicant: Skyhook Wireless, Inc., Boston, MA (US)

(72) Inventor: Farshid Alizadeh-Shabdiz, Wayland, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/160,868

(22) Filed: Jan. 22, 2014

(65) Prior Publication Data

US 2014/0135033 A1 May 15, 2014

Related U.S. Application Data

(63) Continuation of application No. 13/914,850, filed on Jun. 11, 2013, now Pat. No. 8,638,725, which is a continuation of application No. 12/485,588, filed on Jun. 16, 2009, now Pat. No. 8,462,745.

(60) Provisional application No. 61/061,853, filed on Jun. 16, 2008.

(51) Int. Cl.
*H04W 4/00* (2009.01)
*H04W 24/00* (2009.01)
*G01S 5/02* (2010.01)
*H04W 64/00* (2009.01)

(52) U.S. Cl.
CPC ............. *G01S 5/0252* (2013.01); *G01S 5/0263* (2013.01); *H04W 64/00* (2013.01)

(58) Field of Classification Search
None
See application file for complete search history.

(56) References Cited

U.S. PATENT DOCUMENTS

| 6,445,927 | B1 | 9/2002 | King et al. |
| 7,974,642 | B2 | 7/2011 | Lin et al. |
| 2003/0125046 | A1 | 7/2003 | Riley et al. |
| 2006/0009235 | A1 | 1/2006 | Sheynblat et al. |
| 2007/0279281 | A1 | 12/2007 | Oda et al. |

*Primary Examiner* — Marcus R Smith
(74) *Attorney, Agent, or Firm* — Cesari and McKenna, LLP

(57) ABSTRACT

The disclosed subject matter relates to a method and system for increasing the accuracy of a WLAN based position estimate using cellular positioning information. In some embodiments, the method can include determining a set of possible WLAN location solutions for a WLAN and cellular enabled device based on one or more WLAN access points, obtaining cellular measurements from at least one cell tower, and determining the best WLAN location solution from the set of possible WLAN location solutions using the cellular measurements. In one embodiment, the method can include using the cellular measurements from the at least one cell tower to provide a cellular based location estimate for the WLAN and cellular enabled device.

18 Claims, 11 Drawing Sheets

WLAN-PS 401

INCREASING THE ACCURACY OF LOCATION ESTIMATES FOR WIRELESS LOCAL AREA NETWORK (WLAN) AND CELLULAR ENABLED DEVICES

CROSS-REFERENCE TO RELATED APPLICATIONS

This application is a continuation of prior U.S. patent application Ser. No. 13/914,850, entitled, Methods and Systems for Determining Location Using a Cellular and WLAN Positioning System by Selecting the Best WLAN PS Solution, filed Jun. 11, 2013, now U.S. Pat. No. 8,638,725, which is a continuation of U.S. patent application Ser. No. 12/485,588, entitled, Methods and Systems for Determining Location Using a Cellular and WLAN Positioning System by Selecting the Best WLAN PS Solution, filed Jun. 16, 2009, now U.S. Pat. No. 8,462,745, which claims the benefit under 35 U.S.C. §119(e) of U.S. Provisional Application No. 61/061,853, filed on Jun. 16, 2008, entitled "Integrated WLAN-Based and Cellular-Based Positioning System," each of which is herein incorporated by reference in its entirety.

This application is related to the following references:
U.S. patent application Ser. No. 12/485,591, filed Jun. 16, 2009, now U.S. Pat. No. 8,155,666, and entitled "Methods and Systems for Determining Location Using a Cellular and WLAN Positioning System by Selecting the Best Cellular Positioning System Solution;" and
U.S. patent application Ser. No. 12/485,595, filed Jun. 16, 2009 and entitled "Methods and Systems for Improving the Accuracy of Expected Error Estimation in Location Determinations Using a Hybrid Cellular and WLAN Positioning System."

BACKGROUND

1. Field

The disclosure generally relates to hybrid positioning systems and, more specifically, to methods of integrating a wireless local area network (WLAN)-based positioning system (WLAN PS) and a cellular-based positioning system (CPS) to improve the accuracy of location estimates, increase availability of the positioning service to more users, and also to improve estimation of the expected error in a user's position estimate.

2. Description of Related Art

In recent years the number of mobile computing devices has increased dramatically, creating the need for more advanced mobile and wireless services. Mobile email, walkie-talkie services, multi-player gaming, and call-following are examples of how new applications are emerging for mobile devices. In addition, users are beginning to demand/seek applications that not only utilize their current location but also share that location information with others. Parents wish to keep track of their children, supervisors need to track the locations of the company's delivery vehicles, and a business traveler looks to find the nearest pharmacy to pick up a prescription. All of these examples require an individual to know his own current location or the location of someone else. To date, we all rely on asking for directions, calling someone to ask their whereabouts, or having workers check-in from time to time to report their positions.

Location-based services are an emerging area of mobile applications that leverage the ability of new devices to calculate their current geographic positions and report them to a user or to a service. Examples of these services range from obtaining local weather, traffic updates, and driving directions to child trackers, buddy finders, and urban concierge services. These new location-sensitive devices rely on a variety of technologies that all use the same general concept. By measuring radio signals originating from known reference points, these devices can mathematically calculate the user's position relative to these reference points. Each of these approaches has its strengths and weaknesses depending upon the nature of the signals and measurements and the positioning algorithms employed.

Cellular-based positioning uses cell towers to determine the location of a mobile or user device. Cell towers are identified with a unique identifier in each cellular network in each country. Herein, the unique identifies of cell towers is referred to as cell ID. The cell IDs can be stored in a reference database, accessible by the mobile or user device. In the reference database, the cell ID can be used to link that cell ID to a previously determined location for the cell tower having that cell ID, where the location is also stored in the database. CPS can be based on received signal strength (RSS), time of arrival (ToA), or time difference of arrival (TDoA) from cell towers. Cellular-based positioning systems also can be based on the nearest neighbor technique, in which the entire service area is surveyed and a database of reception characteristics of points in the service area is constructed. The location of the survey points also can be logged, for example, by using a global positioning system (GPS). By comparing the reception characteristics of the mobile device with the surveyed points, the location of the mobile device can be determined. CPS can determine the position of a mobile device through several methods, including received signal strength and time of arrival.

CPS location determinations based on received signal strength use the received power of signals received from cell towers and triangulate the position of the mobile device based upon the received power values. The CPS based on received signal strength is not as accurate a system as compared to WLAN PS. The accuracy of the CPS systems using received signal strength is on the order of hundred meters, while the accuracy of WLAN PS is on the order of tens of meters.

CPS location determinations based on TOA measure the time that cellular radio wave travels to get to the mobile device from the cell tower and calculates the distance from the mobile device to the cell towers based on that time. If travel time of the cellular radio wave is measured correctly, the calculated distance from the cell towers can be accurate as WLAN PS, for example, up to ten meters. However, if the travel time is not measured correctly, the error in the location estimate can be higher than WLAN PS, for example, on the order of hundreds of meters up to a kilometer. The TOA method's accuracy depends on estimating the time of arrival of the cellular radio wave (as the name also indicates). In a normal operational environment of cellular network, the received signal is subject to multipath effect, which means the cellular receiver (of the mobile receiver) receives multiple copies of the transmitted signal reflected from the surroundings of the mobile device. These copies of the transmitted signal can arrive at slightly different times, and the selection of the signal which represents the distance between the mobile device and cell tower (or is the best estimate of distance) can be a challenge and an important part of the design of TOA based CPS. Further, there can be an option to consider all copies of the received signal and calculate distance based on all of them. In this case, there will be a set of distances (between the mobile device and cell tower) which will be passed to a trilateration module in the CPS (discussed herein).

The trilateration module considers all the distance measurements from all the cell towers and finds the most likely location of the mobile device.

In the discussion herein, raw CPS measurements from a cell tower are generally intended to mean received signal strength (RSS) and/or times of arrival (TOAs) and/or time differences of arrival (TDOAs). References to cellular data are generally intended to mean the unique address of the cell tower (like cell ID), one or more record(s) of its, one or more power profile(s), and other attributes based on previous measurements of that cell tower. References to a CPS equation are intended to mean a mathematical equation relating the CPS measurements and data to the location of the mobile device.

WLAN-based positioning is a technology which uses WLAN access points to determine the location of mobile users. Metro-wide WLAN-based positioning systems have been explored by a several research labs. The most important research efforts in this area have been conducted by the PlaceLab (www.placelab.com, a project sponsored by Microsoft and Intel); the University of California, San Diego ActiveCampus project (ActiveCampus—Sustaining Educational Communities through Mobile Technology, technical report #CS2002-0714); and the MIT campus-wide location system. There is only one commercial metropolitan WLAN-based positioning system in the market at the time of this writing, and it is referred to herein as the WPS (WiFi positioning system) product of Skyhook Wireless, Inc. (www.skyhookwireless.com).

FIG. 1 depicts a conventional WLAN-based positioning system based on WiFi signals. The positioning system includes positioning software 103 that resides on a mobile or user device 101. Throughout a particular target geographical area, there are a plurality of fixed wireless access points 102 that transmit information using control/common channel signals. The device 101 monitors these transmissions. Each access point contains a unique hardware identifier known as a MAC address. The client positioning software 103 receives transmissions from the 802.11 access points in its range and calculates the geographic location of the computing device using the characteristics of the radio signals. Those characteristics include the MAC addresses, the unique identifiers of the 802.11 access points, the Time of Arrival (TOA) of the signals, and the signal strength at the client device 101. The client software 103 compares the observed 802.11 access points with those in its reference database 104 of access points. This reference database 104 may or may not reside in the device 101. The reference database 104 contains the calculated geographic locations and power profiles of all access points the system has collected. A power profile may be generated from a collection of measurements of the signal power or signal TOA at various locations. Using these known locations or power profiles, the client software 103 calculates the position of the user device 101 relative to the known positions of the access points 102 and determines the device's 101 absolute geographic coordinates in the form of latitude and longitude or latitude, longitude, and altitude. These readings then can be fed to location-based applications such as friend finders, local search web sites, fleet management systems, and an E911 service.

In the discussion herein, raw WLAN measurements from an access point are generally intended to mean received signal strength (RSS) and/or times of arrival (TOAs) and/or time differences of arrival (TDOAs). References to data are generally intended to mean the MAC address, one or more record (s) of it, one or more power profile(s), and other attributes based on previous measurements of that access point. References to a WLAN PS equation are intended to mean a mathematical equation relating the WLAN PS measurements and data to the location of the mobile device.

A WLAN-based positioning systems can be used indoors or outdoors. The only requirement is presence of WLAN access points in the vicinity of the user. The WLAN-based position systems can be leveraged using existing off-the-shelf WLAN cards without any modification other than to employ logic to estimate position.

FIG. 2 illustrates a conventional way of integrating WLAN PS and CPS, which consists of a WLAN PS 201 and a CPS 206 and a location combining logic 210.

WLAN PS 201 and CPS 206 are stand-alone systems, and each can operate independently of the other system. Thus, the result of each system can be calculated independent of the other system. The estimated location along with the expected error estimation of each system can be fed to the location combining logic 210. The expected error estimation is also referred to as HPE (horizontal positioning error) herein. The nominal rate of location update of CPS 206 and WLAN PS 201 is once a second. The location combining logic 210 combines the location estimates calculated in the same second by both systems.

WLAN PS 201 is a conventional system which estimates the location of a mobile device by using WLAN access points (WLAN AP). WLAN PS 201 can include a scanner of WLAN APs 202, a device to select WLAN APs 203, a trilateration module 204, and HPE estimation device 205.

WLAN scanner 202 detects WLAN APs surrounding the mobile device by detecting the received power (RSS, received signal strength) and/or time of arrival (TOA) of the signal. Different methods can be used to detect WLAN APs including active scanning, passive scanning, or combination of passive and active scanning.

The select WLAN APs device 203 selects the best set of WLAN APs to estimate location of the mobile device. For example, if ten WLAN APs are detected and one AP is located in Chicago and the others are located in Boston, without any other information, the Boston APs are selected. This is an indication that Chicago AP has been moved to Boston. In the conventional system, the best set of WLAN APs is selected based on geographical distribution of WLAN APs, in addition to corresponding parameters of WLAN APs, including received signal strength, signal to noise ratio, and the probability of being moved.

Trilateration module 204 uses WLAN APs and corresponding measurements and characteristics to estimate location of the mobile device. Received signal strength or TOA measurements from a WLAN AP are used to estimate distance of the mobile device to the WLAN AP. The aggregation of distance estimates from different WLAN APs with known location is used to calculate location of the mobile device. Trilateration 204 also can use a method which is called nearest neighbor, in which a location with a power profile similar or closest to the power reading of the mobile device is reported as the final location of the mobile device. The power profile of each WLAN AP or entire coverage area can be found in the calibration phase of the system by detailed survey of the coverage area.

HPE estimation device 205 is a module which estimates the expected error of the position estimate of the mobile device. The HPE or Horizontal Positioning Error is calculated based on previously scanned APs and their characteristics and also characteristics of the received signal as it was explained in co-pending Skyhook Wireless application Ser. No. 11/625, 450 entitled "System and Method for Estimating Positioning Error Within a WLAN Based Positioning System," the entire disclosure of which is hereby incorporated by reference.

CPS system 206 can include a cellular scanner 207, trilateration device 208, and the CPS HPE estimation module 209.

The cellular scanner 207 receives signals from one or more cell towers in view of the device, decodes the received signals, and measures received signal strength (RSS) and/or time of arrival (TOA) and/or time difference of arrival (TDOA) of the signals based on the approach taken in the trilateration module 208.

The trilateration device 208 uses measurements from cell towers to estimate the location of the mobile device. HPE estimation device 209 estimates the expected error of the estimated location. The HPE estimation device 209 is conventional and calculates expected error based on geometry of the cell towers and signal quality of the received signal from cell towers, for example C/N (carrier to noise ratio).

Location combining logic 210 receives simultaneous location estimates and HPE estimates from WLAN PS 201 and CPS 206. Simultaneous location estimations include estimations within one second of each other. The location combining logic 210 reports one estimated location by selecting one WLAN or CPS estimate or by linearly combining them. For example, location combining logic might select the WLAN PS 201 estimate. Otherwise, it may report the CPS estimated location, it might report the final location based on an expected error, or it might report a weighted average of the estimated locations by both systems according to the HPE.

SUMMARY

The disclosed subject matter generally relates to hybrid positioning systems and, more specifically, to methods of integrating wireless local area network (WLAN)-based positioning system (WLAN PS) and cellular-based positioning system (CPS) to improve accuracy of location estimates, increase availability of the positioning service to more users, and improve estimation of the expected error in a user's position estimate.

Embodiments provide systems and methods of integrating a WLAN-based positioning system (WLAN PS) and a cellular-based positioning system (CPS). An integrated system refers herein to a system that combines the information and measurements from both systems in order to increase the availability of the positioning service to more users to improve the accuracy of the positioning estimates, as compared to each individual system working independently. The integration can occur at different levels from a high-level combination of location estimation provided by both systems to the lowest level of integration of raw measurements from both systems and combining them to find the best estimate of the location of a user or a mobile device. The integration also includes using information from one system to assist the other system so as to increase the accuracy of the various estimates.

The disclosed subject matter relates to a method and system for increasing the accuracy of a WLAN based position estimate using cellular positioning information. In some embodiments, the method can include determining a set of possible WLAN location solutions for a WLAN and cellular enabled device based on one or more WLAN access points, obtaining cellular measurements from at least one cell tower, and determining the best WLAN location solution from the set of possible WLAN location solutions using the cellular measurements.

In some embodiments, the method can include using the cellular measurements from the at least one cell tower to provide a cellular based location estimate for the WLAN and cellular enabled device.

In some embodiments, the method can include determining the best WLAN location solution from the set of possible WLAN location solutions using the cellular based location estimate.

In some embodiments, determining the best WLAN location solution from the set of possible WLAN location solutions using the cellular based location estimate can include determining a distance between each of the possible WLAN location solutions and the cellular based location estimate, and selecting the best WLAN location solution based on which of the possible WLAN location solutions is within an expected error of the cellular based location estimate.

In some embodiments, determining the best WLAN location solution from the set of possible WLAN location solutions using the cellular based location estimate can include eliminating possible WLAN location solutions which are far from cellular based location estimate.

In some embodiments, the set of possible WLAN location solutions can include a WLAN access point cluster.

In some embodiments, the method can include weighing the WLAN access point cluster according to the distance from each WLAN location solution to the cellular based location estimate.

In some embodiments, the method can include selecting WLAN location solutions having a small distance to the cellular based location estimate. In some embodiments, the small distance is on the order of a hundred meters.

In some embodiments, the method includes eliminating WLAN location solutions having a large distance to the cellular location solution. In some embodiments, the large distance is on the order of tens of kilometers.

In some embodiments, each WLAN location solution in the set of possible WLAN location solutions can correspond to a location of a WLAN access point.

In some embodiments, the method can include comparing the location of each WLAN access point to the known location of the WLAN access point stored in a WLAN reference database, and if the location of the WLAN access point does not correspond to the known location of the WLAN access point in the WLAN reference database, determining that the WLAN access point has moved.

In some embodiments, the method can include updating the known location of the WLAN access point in the WLAN reference database to correspond to the location of the WLAN access point.

In some embodiments, the cellular measurements can include the cell ID of the cell tower.

In some embodiments, the method can include accessing a cellular reference database containing cell tower reference locations for each cell ID, comparing the cell tower reference location to the cellular based location estimate, and if the cell tower reference location and the cellular based location do not match, informing the cellular reference database that the locations do not match.

In some embodiments, the method can include updating the cellular reference database with the cellular based location.

In one aspect, the disclosed subject matter relates to a system for increasing the accuracy of a WLAN based position estimate using cellular positioning information. The system can include a positioning module having a WLAN module for receiving information from one or more WLAN access points and a cellular positioning module for obtaining cell tower information from at least one cell tower, logic located in the WLAN module to determine a set of possible WLAN location solutions for a WLAN and cellular enabled device based on one or more WLAN access points, and logic located in the positioning module to use the cell tower information to determine the best WLAN location solution from the set of possible WLAN location solutions using the cell tower information.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION OF THE INVENTION

Embodiments of the disclosed subject matter provide a method of integrating a WLAN-based positioning system (WLAN PS) and a cellular-based positioning system (CPS) to create a hybrid positioning system. An integrated or hybrid system refers to a system which inputs the measurements and location estimates from one system to another system before location estimate to improve the accuracy of the positioning and velocity and bearing estimates, and the accuracy of expected error estimate, as compared to each individual system working independently. The method of integrating a WLAN PS and CPS to create a hybrid positioning system can add CPS final estimates as another input to WLAN PS and WLAN PS final estimations as another input to CPS. In one embodiment, raw CPS measurements and raw WLAN PS measurements also can be integrated to select the best set of measurement to increase the accuracy of position estimate and HPE.

Figure 3:
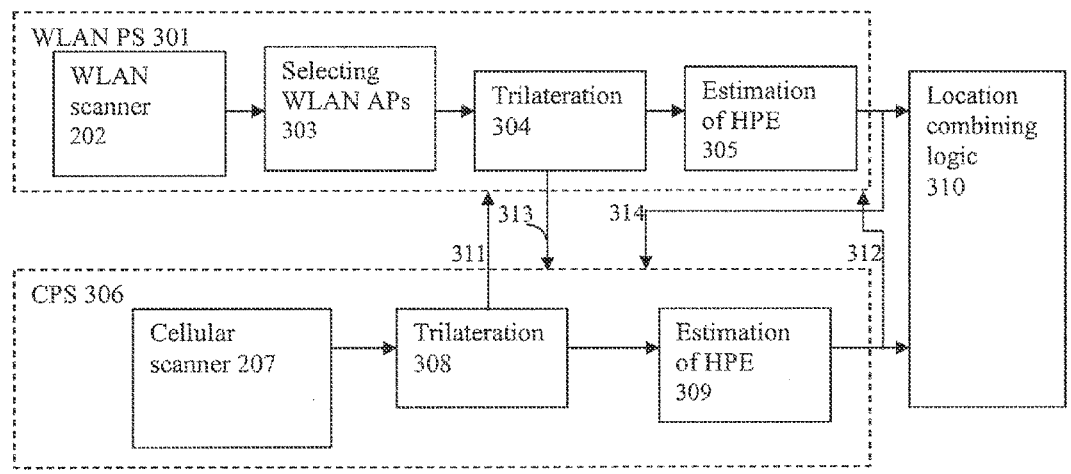
FIG. 3 illustrates a system for providing a WLAN PS and CPS integrated location solution, according to some embodiments of the disclosed subject matter.

FIG. 3 illustrates a block diagram of a hybrid system of a WLAN PS 301 and a CPS 306.

Figure 1:
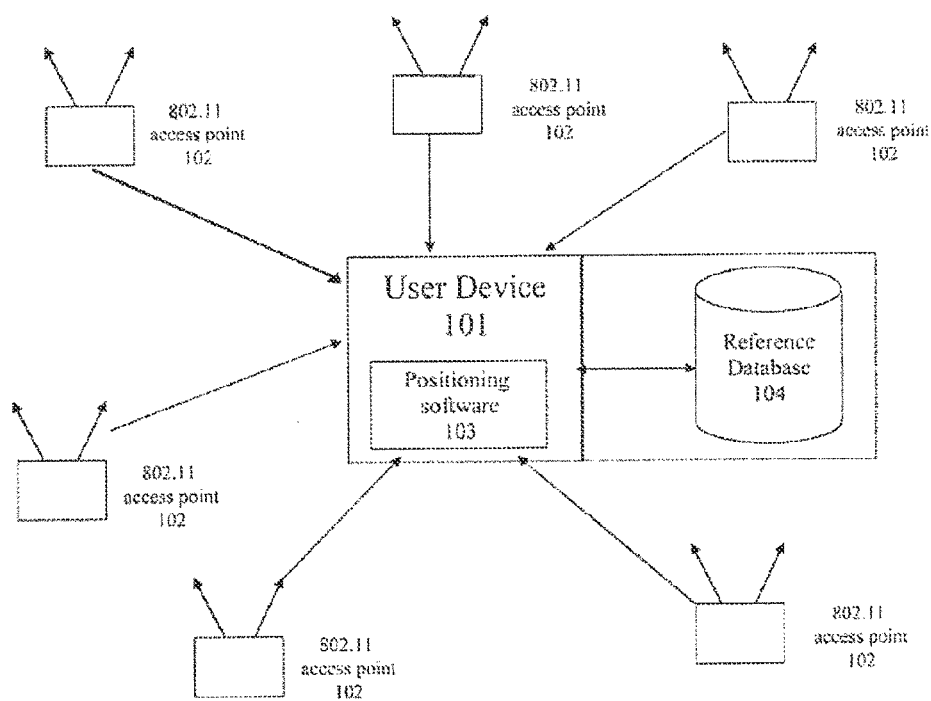
FIG. 1 illustrates a high-level architecture of a WLAN positioning system.
Figure 2:
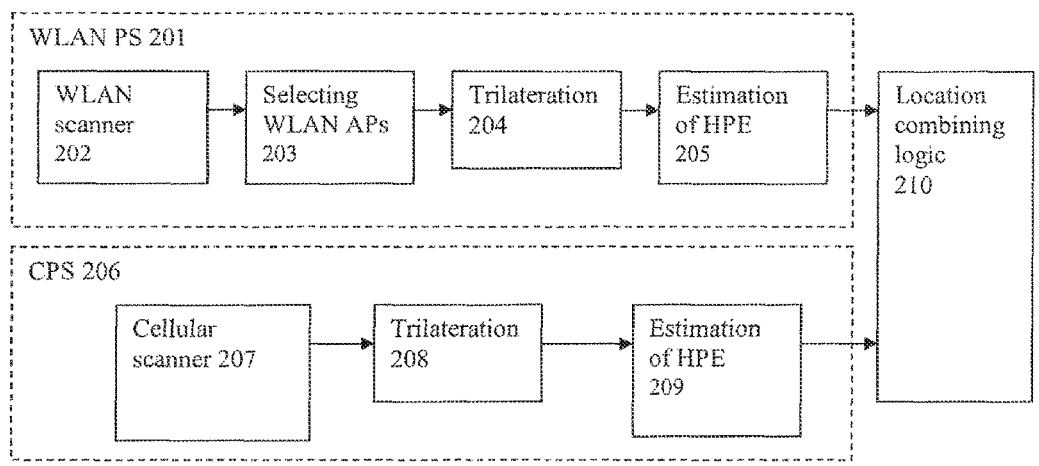
FIG. 2 illustrates a system for a conventional system for integrating WLAN PS and CPS.

The CPS 306 functions in a similar manner as the CPS 206 shown in FIG. 2 except that it is configured to receive a WLAN PS trilateration output 313 and a location estimation output 314 from the WLAN PS 301 and also to provide CPS trilateration 311 results to the WLAN PS. The integration of the WLAN PS trilateration and location estimation results with CPS 306 changes the design of CPS trilateration device 308 and HPE estimation device 309. A conventional CPS might need to be modified to provide the trilateration device's 308 results 311 outside of the CPS system.

This design change of CPS 306 after receiving WLAN PS information 313, 314 is discussed in more detail herein.

The WLAN PS 301 functions in a similar manner as the WLAN PS 201 shown in FIG. 2 except that it is configured to receive CPS trilateration output 311 and CPS location estimation 312 and to provide WLAN PS trilateration results 313. The integration of the CPS trilateration and location estimation results with the WLAN PS 301 changes the design of WLAN APs selection device 303, trilateration device 304, and HPE estimation device 305.

This design change of WLAN PS 301 after receiving CPS information 311 is discussed in more detail herein.

Under one embodiment, the disclosed method integrates a WLAN-based positioning system (WLAN PS) and a cellular positioning system (CPS) in which the WLAN PS provides a set of possible locations of a mobile device, and the CPS provides a location estimate of the mobile device. Among the possible WLAN PS location estimates, the WLAN location estimations which fit the CPS location estimate the best are selected as the final set of position estimates for the WLAN PS and CPS enabled mobile device.

In WLAN PS, the mobile device can detect one or more WLAN access points (WLAN APs), which can be used as reference points to locate the mobile device. The WLAN access points are generally randomly distributed and may move over time. Therefore, the WLAN positioning system applies a clustering algorithm to identify all the clusters of WLAN access points that are detected by the end user. Once the APs have been identified and grouped into clusters, the location of the device can be determined by using either each AP separately or by using the clusters of APs.

A cluster of WLAN access points is a set of WLAN access points where each access point is in the coverage area of each of the other access points. WLAN access points which are farther than a normal coverage of an access point from the cluster are considered to be part of a new cluster.

Once the APs have been identified and grouped into clusters, the location of each cluster of WLAN APs is estimated. The location of each cluster can be considered a possible location of the mobile device. Additionally, the CPS can provide a position estimate for the mobile device using cellular measurements from at least one cell tower. By combining WLAN PS and CPS position estimates, WLAN PS possible locations can be rejected if the distance from the WLAN PS possible locations to the CPS location estimate is an order of magnitude higher than accuracy of the CPS, where an exemplary accuracy of a CPS can be a few hundred meters. For example, if the distance between the CPS location estimate and a WLAN PS cluster is tens of kilometers, that cluster of WLAN APs can be rejected. In some embodiments, the location of individual APs, instead of clusters of APs, also can be examined against the CPS location estimate. For example, if two clusters of APs are pointing to Boston, one cluster of APs is pointing to Chicago and the CPS location estimate is in Boston, one of the APs pointing to Chicago or the cluster of APs pointing to Chicago can be examined against the CPS location estimate.

The final location can be calculated based on the remaining WLAN possible solutions, i.e., the remaining clusters of WLAN APs.

Figure 4A:
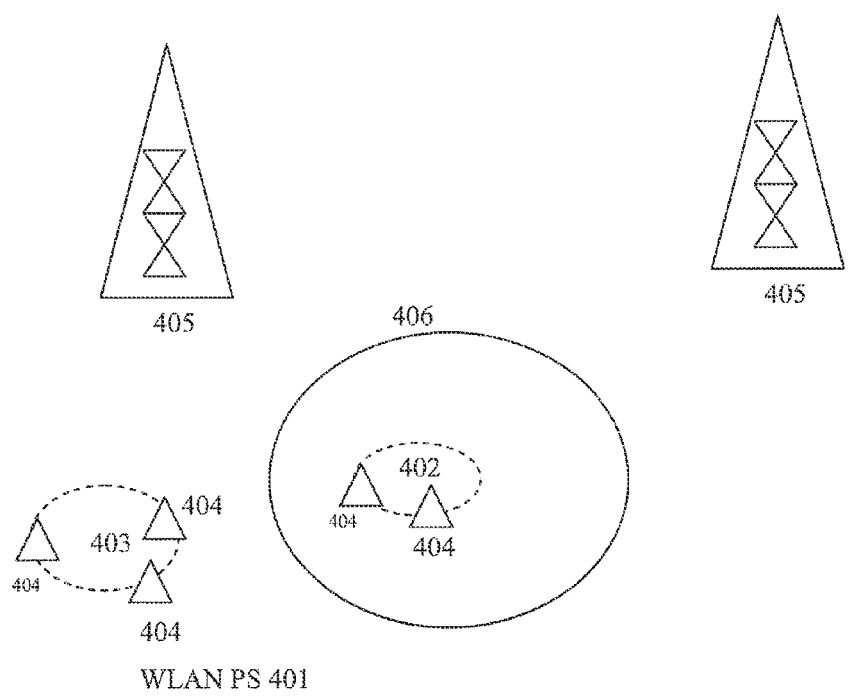
FIG. 4A illustrates an example of selecting a solution between possible WLAN PS solutions using a CPS location estimate, according to some embodiments of the disclosed subject matter.

For example, FIG. 4A shows a WLAN PS 401, which consists of five WLAN access points 404. The WLAN access points form two clusters in this example, a first cluster 402 and a second cluster 403. Each cluster can be used to estimate the location of the user device. CPS also detects two cell towers 405 and estimates a location for the mobile device 406.

If distance between possible solutions of the WLAN PS is on an order of magnitude higher than the coverage area of the detected cell towers in CPS, the location estimate or solution 406 of the CPS can be used to select or eliminate WLAN AP clusters.

In this example, let us assume that cluster 402 and 403 are pointing to different cities like Boston and Seattle. The CPS location estimate 406 is consistent with cluster 402, and cluster 403 is rejected. Therefore, cluster 402 is selected to calculate the user location. In some instances, cluster 403 can be assumed to be moved or relocated to Boston. Because we know that the user's location is in Boston, we can assume that the user's device cannot be detecting using an AP in Chicago. Therefore, the cluster 403 can be assumed to have been relocated to Boston; otherwise, the user in Boston would not be detecting that access point. Further, the locations of the WLAN APs are tracked in one or more reference databases to which the user device has access. The user device accessed the reference database to determine that the WLAN APs reference location is Chicago. Because the user device has determined that the WLAN AP or cluster of WLAN APs have moved, the user device can send a message to the reference database to update the database to reflect that the new location of that WLAN AP or cluster of APs is Boston. The reference database can then be updated to reflect that new location. (For more details on detecting moved access points, please see U.S. patent application Ser. No. 11/359,154, entitled "Continuous Data Optimization of Moved Access Points in Positioning Systems," filed Feb. 22, 2006; the entire contents are hereby incorporated by reference.) Therefore, cluster 403 WLAN APs can be identified as moved in the reference database, and their location is updated. Therefore, clusters of WLAN APs which are not referring to the same general location as the CPS estimated location can be considered to be incorrect. In other words, the associated location of WLAN APs of those clusters can be considered to be inaccurate or stale, that is, the WLAN AP may have moved.

Under some embodiments, the disclosed method integrates a WLAN-based positioning system (WLAN PS) and a cellular positioning system (CPS) in which the WLAN PS provides one location estimate of a mobile device, and the CPS provides one location estimate of the mobile device, and the consistency between the WLAN PS and the CPS location estimates is used to choose a WLAN PS location estimate. Note that there is only one location estimation reported by each WLAN PS and CPS.

Figure 4B:
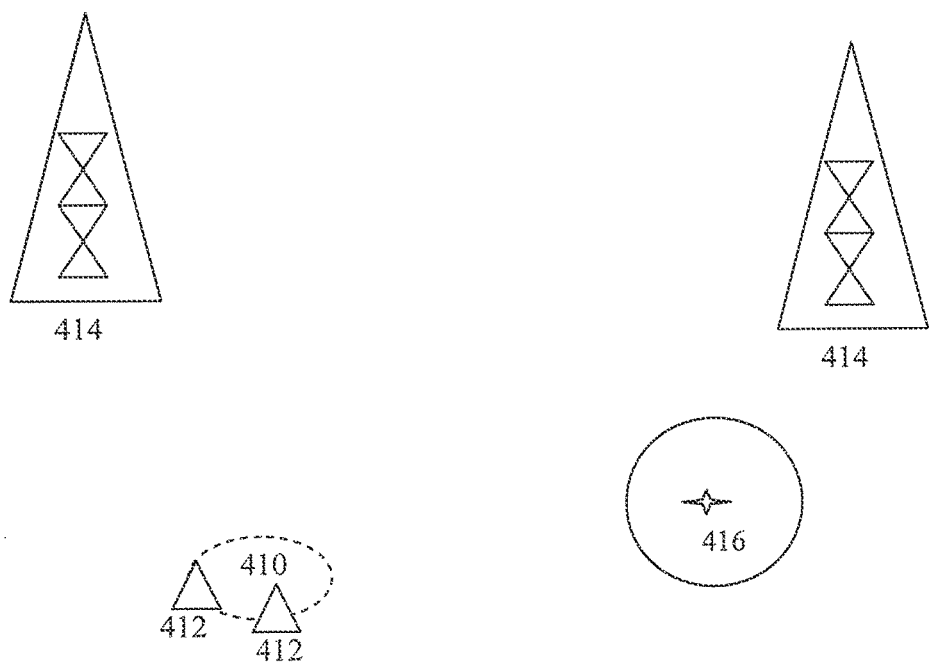
FIG. 4B illustrates an example of selecting a detecting moved access points/access point clusters or cell tower IDs, according to some embodiments of the disclosed subject matter.

FIG. 4B illustrates an integrated solution of WLAN PS and CPS, in which WLAN PS 401 estimates a location 410 based on detected WLAN APs 412, which is far from CPS cell tower 414 location estimate 416. For example, if the WLAN PS locates the mobile device in Boston and the CPS locates the mobile device in Chicago, the discrepancy between WLAN PS and CPS location estimates indicate that either WLAN AP 412 has moved or CPS location estimate is not correct and the detected cell IDs have moved.

The WLAN PS can detect one or more WLAN APs. The WLAN PS extracts associated information about each detected WLAN AP from a reference database. The known WLAN APs (i.e., WLAN APs for which the reference database has location information) are used to locate the mobile device.

CPS also can detect one or more cell IDs of cell towers and extracts cell information for the detected cell IDs, for example, location and the coverage size of the cell tower associated with that cell ID. The detected cell IDs can be used to estimate the location of the mobile device. The estimated location by CPS can be used to verify the general location of the WLAN PS estimated location.

If the CPS and WLAN PS location estimates are pointing to the same general location (WLAN PS location estimate is within the expected accuracy of the CPS location estimate), the WLAN PS estimated location can be reported as final location of the mobile device. If the CPS and WLAN PS location estimates are pointing to locations that not in the same general location, this can indicate that the WLAN APs have moved or the associated location of the detected cell IDs are not correct.

Further, if a confidence of one of the location estimates reported by WLAN PS or CPS is high and it is higher than the other reported location, the estimated location with the highest level confidence is reported as the final estimated location of the mobile device. For example, if the latest locations of cell IDs are provided by the cellular carrier and most probably are correct, the confidence to the location associated to cell IDs is very high. Then, the location estimates WLAN system can be assumed to be incorrect. The discrepancy between the measurements can be reported back to the corresponding reference database. The WLAN AP or AP cluster locations can be updated in the corresponding reference database. If the confidence of either location is at the same level, then no location may be reported. This determination can be reported back to corresponding reference databases as an indication of possibility of WLAN AP movement and also a change of cell ID associated location information.

WLAN AP movement is estimated to occur more often than a change in the location of cell IDs. Therefore, in the case that WLAN PS and CPS location estimates are not consistent and distance between the estimated locations is an order of magnitude higher than the coverage of detected cell towers, the CPS location estimate is considered as the final location estimate of the mobile device, and it can be assumed that detected WLAN APs were moved to the new location.

If it is detected that a WLAN AP was moved, the new location in which the WLAN AP was detected can be used to correct and update location of the WLAN AP in the reference database.

Figure 5:
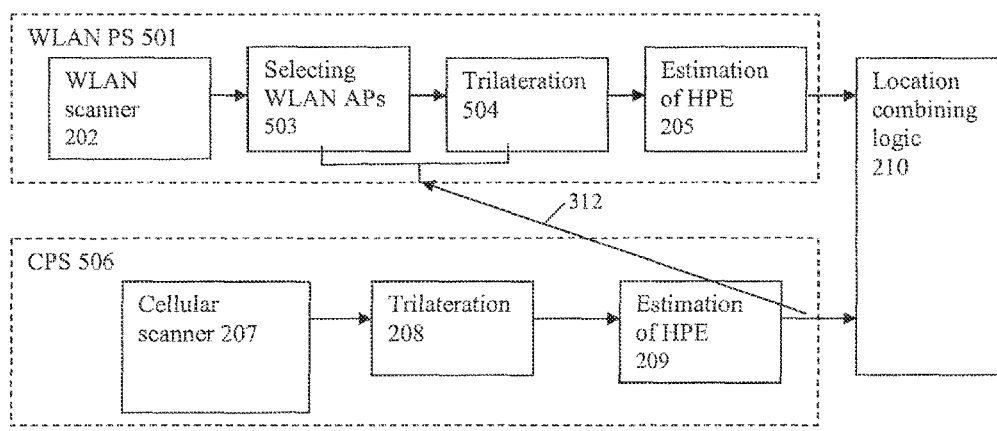
FIG. 5 illustrates a system for integrating a WLAN PS and a CPS in which a CPS location estimate is provided to the WLAN PS to select the best solution, according to some embodiments of the disclosed subject matter.

FIG. 5 illustrates block diagram of integrated solution of CPS and WLAN PS. CPS 506 can be a standard, off-the-shelf device as discussed in FIG. 2. The CPS location estimate result 312 is directed to selecting WLAN APs module 503 and trilateration device 504.

The WLAN APs selection devices 503 received the data from WLAN scanner 202 and the CPS location estimate as an input. The WLAN APs selection device 503 clusters WLAN APs based on the distance between the access points and it results in one or more cluster. The clusters are used in the trilateration device 504 to find possible location estimates of the mobile device. The WLAN PS location estimates based on clusters are selected or rejected based on the cluster distance from the CPS location estimate.

Under one embodiment, WLAN PS is used to detect and correct when the cell ID associated location is not correct and the cell ID has been re-assigned to a cell tower with a different location. Cell towers are subject to reconfiguration and change of their cell IDs. In a cellular network, cell towers less often physically move and are more often reconfigured and the cell IDs are re-assigned. However, cellular network reconfiguration happens rarely. When cellular networks are reconfigured, cell IDs may be re-assigned to another cell tower and the other cell tower may not be in the same area as the original cell tower. This can result in an incorrect location association for some cell IDs. If a mobile device detects a set of reconfigured cell towers that still refer to their old configuration with the old location of the towers, the mobile device may find that the detected cell towers are an order of magnitude farther away than the normal coverage of a cell tower. The normal coverage of a cell tower is between couple of hundred meters to couple of kilometers, but coverage of any particular cell tower can be estimated based on the density of cell towers or by site survey of the area. Therefore, using different cell towers can result to different location estimates. Thus, there are cases that the mobile device may detect one or more cell towers with cell IDs whose associated locations are not consistent with their recorded location in a reference database. In other words, the associated location of cell IDs point to different locations.

For example, if a mobile device detects five towers, two towers may point to Chicago and three others may point to Boston. In this case, the WLAN PS estimated location of the mobile device can be used to resolve the discrepancy between cell IDs and location. In the example, if WLAN PS location estimate is in Boston, it can be concluded that the cell IDs pointing to Boston are correct and cell IDs pointing to Chicago are not correct. Thus, the WLAN PS location estimate can be used to identify if the cell IDs are pointing to an incorrect location and therefore have been re-assigned to a different cell tower.

If cell ID movement is detected, the location of WLAN PS can be used as a reference to correct and update location of the cell IDs which are registered at an incorrect location in the reference database.

Figure 6:
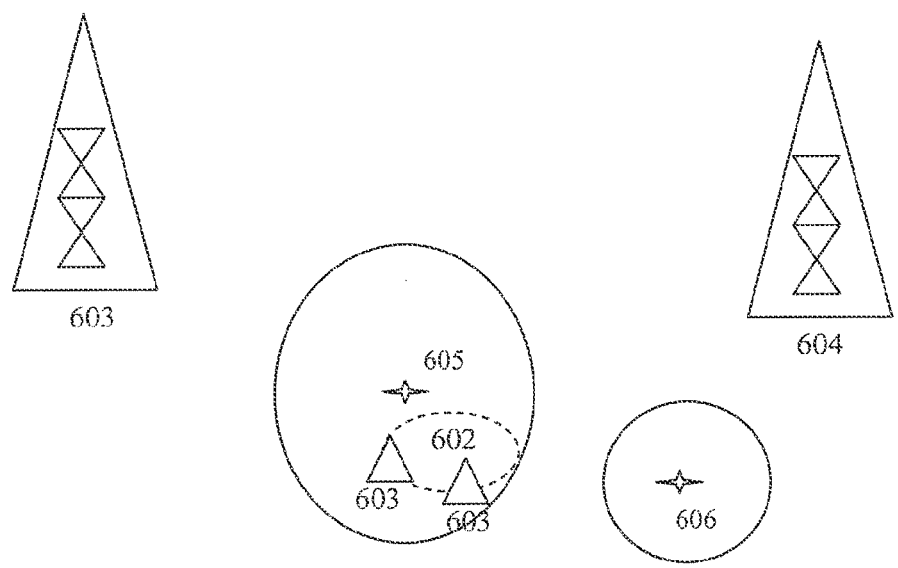
FIG. 6 illustrates an example of selecting a solution between possible CPS solutions based on a WLAN PS location estimate, according to some embodiments of the disclosed subject matter.

FIG. 6 shows CPS and WLAN PS, in which CPS results to two different location estimates 605 and 606 and a WLAN positioning system 601 with a location estimate 602. The detected cell towers 603 and 604 are far apart and resulting in two different location estimates 605 and 606. In this example, WLAN PS location estimate 602 is consistent with CPS location estimate 605. Therefore, it is concluded that the cell ID of the cell tower 604 was changed, and the cell ID of cell tower 604 is located in the vicinity of the cell tower 603 and WLAN PS location estimate 602.

Figure 7:
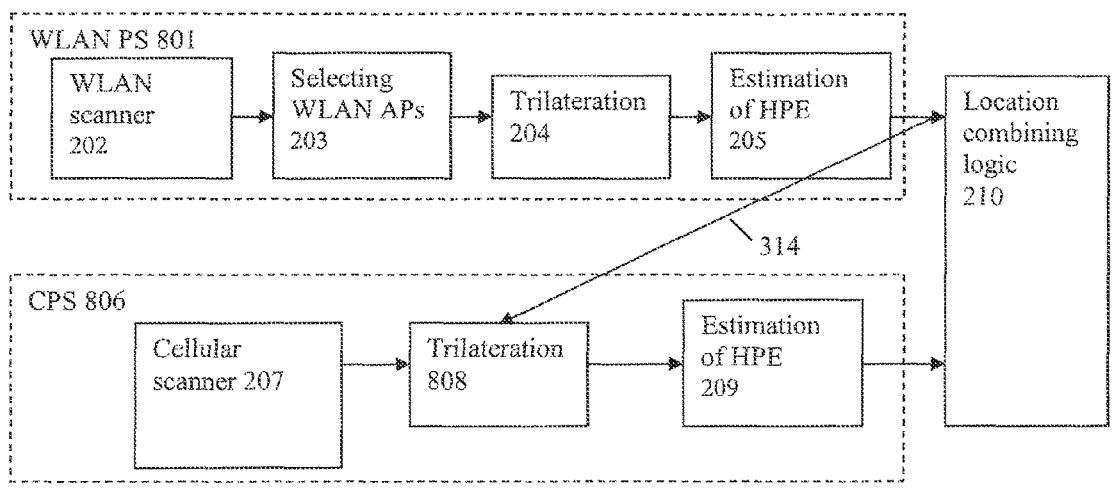
FIG. 7 illustrates a system for integrating a WLAN PS and a CPS and using a WLAN PS location estimate to select a CPS location estimate among possible CPS possible location estimates, according to some embodiments of the disclosed subject matter.

FIG. 7 illustrates WLAN PS 801 and CPS 806 integrated solution, in which all the modules are the same as FIG. 2, except for CPS trilateration 808. Trilateration based on cell towers 808 also receives WLAN PS location estimate 314 as an input. When CPS trilateration 808 provides multiple possible location estimates for the mobile device, the WLAN PS location estimate is used to detect cell towers having changed cell IDs and assigned to new locations.

Under another embodiment of the disclosed subject matter, a system and method is provided in which the WLAN PS can provide a region in which a possible location solution resides, and within the provided region the final location estimate of the mobile device can be selected based on CPS. This method can be used when the expected error of the CPS location estimate is less than the expected error of WLAN PS location estimate. For example, when CPS uses TOA or TDOA technology and there is a line of sight connection between the mobile device and the cell towers, the expected error of CPS can be less than that of WLAN PS. When CPS uses TOA and TDOA technology, the arrival time of received signal from each cell tower can be estimated. The received signal in cellular network can be subject to multipath, and there can be multiple copies of the received signal. Therefore, there can be multiple choices for the arrival time of the signal, which can result in different distance estimations between the mobile user and the cell tower. Thus, a set of distance measurements from two or more cell towers can result in multiple possible location estimates for the mobile device. CPS possible solutions are combined or selected by additional location information provided by WLAN PS about the location of the mobile device. For example, the CPS solution closest to the WLAN PS location solution can be selected as the final location estimate of the mobile device or possible solutions of CPS can be weighted according to their distance to the WLAN PS solution. After assigning a weight to each possible CPS location, various algorithms can be used to combine or select CPS possible locations. For example, the final reported location can be weighted by an average of all possible locations, low weight locations can be removed from the weighted average, or only the highest weighted location can be reported. Selection can be a special case of weighting, in which the respective weights are zero and one. A low weight can correspond to a CPS estimate that is far from the WLAN PS solution, for example, on the order of hundreds of meters. A high weight can correspond to a CPS estimate that is close to the WLAN PS solution, for example, within on the order of tens of meters.

Figure 8:
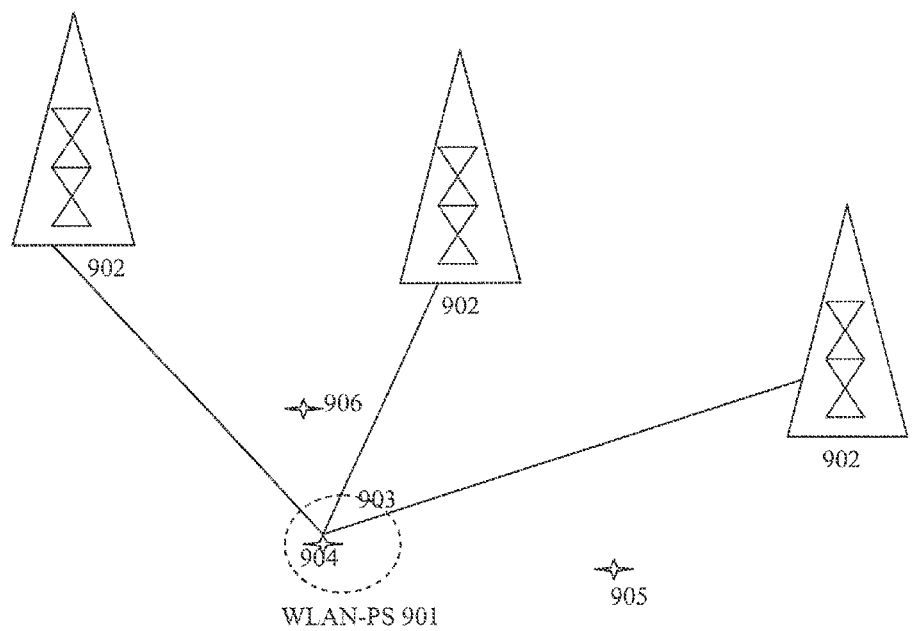
FIG. 8 illustrates a system for examining the location estimate and uncertainty provided by a WLAN PS against a CPS location measurements in order to find the best estimate of the location of a mobile device, according to some embodiments of the disclosed subject matter.

In some embodiments, there is only a measurement from one cell tower. Therefore, only the distance from one cell tower is known, which results to a circle of possible solutions of cell positioning system, and the cellular based position estimate (in the circle of possible CPS solutions) closest to the WLAN location estimate is selected as the location of the WLAN and cellular enabled device FIG. 8 shows an integrated WLAN PS and CPS, in which WLAN PS 901 provides an estimate of the location of the mobile device with some uncertainty 903. The uncertainty 903 can be the expected error of WLAN PS. The mobile device also acquires signals from two or more cell towers 902. CPS uses TOA in this example, and it returns a set of possible location estimates 904, 905, and 906. The location estimate 904 can be the final location estimate of the mobile device, because it is consistent with WLAN PS location estimate 903.

Referring back to FIG. 7, FIG. 7 shows an integrated solution of WLAN PS 801 and CPS 806 in which final location estimate 314 provided by WLAN PS is given to CPS trilateration device 808. However, in this embodiment, the CPS trilateration device 808 uses the WLAN PS location estimate 314 to select the best CPS location estimate instead of using the WLAN PS location estimate 314 to determine if the cell ID has moved.

WLAN PS 801 is an off the shelf system. The CPS 806 and trilateration device 808 can be modified to receive the WLAN PS location estimate 314 as an input. When the distance between associated locations of at least two detected cell IDs are an order of magnitude higher than normal coverage of the detected cell towers, the WLAN PS location estimate 314 can be used as an arbitrator to select cell IDs which are in the general area of the WLAN PS location estimate. Other cell IDs which are not in the general area of the WLAN PS location estimate can be marked as changed, i.e., the associated location of the cell tower was moved. Selecting the best set can mean selecting the one which is not moved. In other words, best set can be the set which has not moved.

Another embodiment of the invention provides a method to increase the accuracy of the expected error of a location estimate of an integrated location solution of CPS and WLAN PS and compare the integrated error to error location results for each individual system. The expected error estimation provides an uncertainty area around the estimated location. If the estimated locations of the WLAN PS and the CPS are within the uncertainty area of each other, i.e., the expected errors of the two systems are consistent, the uncertainty area of the final estimate can be reduced based on distance between estimated locations from both systems. If the estimated locations of WLAN PS and CPS are not within the uncertainty area of each other, i.e., the expected errors are inconsistent, the uncertainty area is increased based on distance between estimated locations from both systems. If only one of the estimated locations of WLAN PS and CPS falls inside the uncertainty area of the other system, the uncertainty area can be reduced or increased based on the quality of estimated error from each system. The estimated error of location estimate normally reports the 95% confidence interval, but it can report any other confidence interval as well.

Figure 9:
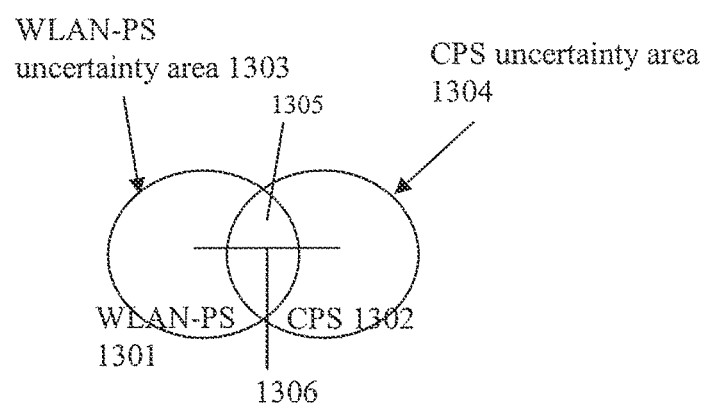
FIG. 9 illustrates an example for increasing the accuracy of an estimation of expected error by using CPS and WLAN PS information, according to some embodiments of the disclosed subject matter.

FIG. 9 illustrates WLAN PS location estimation 1301, WLAN PS expected error of estimation 1303, CPS location estimation 1302 and CPS expected error of estimation 1304. The reported uncertainty by each system can be the expected error of a final position estimate. The error of estimation also can be referred to as uncertainty area.

In such a system, the CPS and WLAN PS each can provide a location estimate and also an estimate of the expected error in that location estimation. The expected errors of the location estimate provided by both systems can be combined in order to provide a better estimate of the error of the location estimation. For example, if each system provides an area around the reported location as an uncertainty of the estimated location (1303 and 1304), the integrated system considers the overlap of the uncertainty areas 1305 and also the distance between estimated locations 1306 to estimate the uncertainty of the final location estimate. The greater the distance between the estimated locations by CPS and WLAN PS is, the higher the expected error of location estimation. In another implementation, the system can select the location estimate with the lowest uncertainty as the final location estimate.

Figure 10:
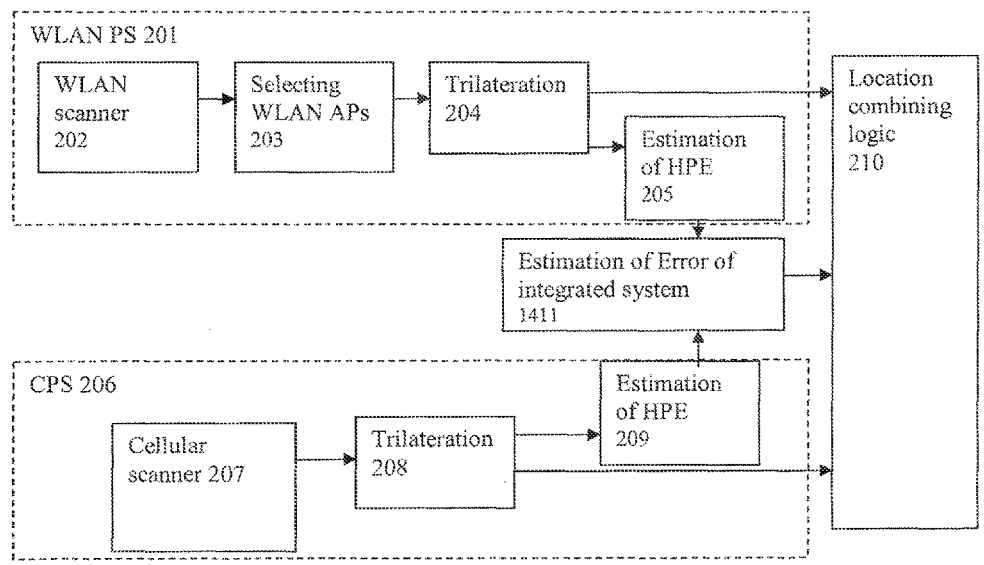
FIG. 10 illustrates a system for increasing the accuracy of an estimation of expected error by using CPS and WLAN PS information, according to some embodiments of the disclosed subject matter.

FIG. 10 illustrates a block diagram of integrated WLAN PS and CPS system, in which the expected error of each system is calculated using conventional methods, and the results are provided to integrated error estimation system device 1411. The integrated error estimation 1411 calculates the final expected error by considering the consistency between the reported locations by WLAN PS and CPS.

Upon review of the description and embodiments of the present invention, those skilled in the art will understand that modifications and equivalent substitutions may be performed in carrying out the invention without department from the essence of the invention. Thus, the invention is not meant to be limiting by the embodiments described explicitly above and is limited only by the claims which follow. Further, the features of the disclosed embodiments can be combined, rearranged, etc., within the scope of the invention to produce additional embodiments.

What is claimed is:

1. A method of increasing the accuracy of location estimates for wireless local area network (WLAN) and cellular enabled devices, the method comprising:

by a WLAN positioning system (PS),
identifying at least one WLAN access point (AP) in signal range of a WLAN and cellular enabled device based on wireless signals received by the WLAN and cellular enabled device transmitted by the at least one WLAN AP,
retrieving an estimated location of the at least one WLAN AP stored in a reference database, and
determining a WLAN-based location estimate for the WLAN and cellular enabled device based at least in part on the estimated location of the at least one WLAN AP;
by a cellular positioning system (CPS),
identifying at least one cell tower in signal range of the WLAN and cellular enabled device based on cellular signals received by the WLAN and cellular enabled device transmitted by the at least one cell tower, the at least one cell tower having a cell identifier (ID) associated with a location stored in the reference database, and
determining a cellular-based location estimate for the WLAN and cellular enabled device based at least in part on the location associated with the cell ID;
comparing the cellular-based location estimate to the WLAN-based location estimate to determine whether a distance between the cellular-based location estimate and the WLAN-based location estimate exceeds a pre-determined threshold; and
upon the condition that the distance exceeds the pre-determined threshold, inferring that the location associated with the cell ID is inaccurate and updating the location associated with the cell ID in the reference database, the updated location used in determining resulting location estimates for the WLAN and cellular enabled devices.

2. The method of claim 1, wherein the determining the cellular-based location estimate comprises:
determining a set of cellular-based location estimates of which the cellular-based location estimate is a member, wherein the WLAN-based location estimate is consistent with at least one other cellular-based location estimate of the set of cellular-based location estimates.

3. The method of claim 1, wherein the resulting location estimate for each of the WLAN and cellular enabled devices is based at least in part on wireless signals received by a respective WLAN and cellular enabled device transmitted by at least one WLAN AP and cellular signals received by the respective WLAN and cellular enabled device transmitted by at least one cell tower.

4. The method of claim 3, wherein the at least one WLAN AP whose wireless signals are received by the respective WLAN and cellular enabled device includes at least one WLAN access point cluster of a plurality of WLAN APs, and wherein the reference database includes a plurality of estimated locations corresponding to an estimated location of a plurality of WLAN APs in the at least one WLAN access point cluster.

5. The method of claim 4, further comprising:
weighting the at least one WLAN access point cluster according to a distance from a plurality of estimated locations corresponding to the plurality of WLAN APs in the at least one WLAN access point cluster to a cellular-based location estimate for the respective WLAN and cellular enabled device for use in determining the resulting location estimate for s the respective WLAN and cellular enabled device.

6. The method of claim 5, further comprising selecting estimated locations corresponding to the plurality of WLAN APs in the at least one WLAN access point cluster having a distance to the respective cellular-based location estimate that is less than a pre-determined distance, for use in determining the resulting s location estimate for the respective WLAN and cellular enabled device.

7. The method of claim 6, wherein the pre-determined distance is on the order of a hundred meters.

8. The method of claim 1, wherein the pre-determined threshold is an order of magnitude greater than a coverage area of the at least one cell tower.

9. The method of claim 8, wherein the pre-determined threshold is on the order of tens of kilometers away from the estimated location of the at least one cell tower.

10. The method of claim 1, further comprising updating the location associated with the cell ID stored in the reference database to correspond to the estimated location of the at least one WLAN AP.

11. The method of claim 1, wherein the cellular signals include the cell ID of the at least one cell tower.

12. A system for increasing the accuracy of location estimates for wireless local area network (WLAN) and cellular enabled devices, the system comprising:
   a wireless local area network (WLAN) module for receiving wireless signals transmitted by at least one WLAN access point (WLAN AP);
   a cellular module for receiving cellular signals from at least one cell tower; and
   logic configured to
      identify the at least one WLAN AP in signal range of a WLAN and cellular enabled device based at least in part on the wireless signals,
      retrieve an estimated location of the at least one WLAN AP stored in a reference database,
      determine a WLAN-based location estimate for the WLAN and cellular enabled device based at least in part on the estimated location of the at least one WLAN AP,
      identify the at least one cell tower in signal range of the WLAN and cellular enabled device based on cellular signals received by the WLAN and cellular enabled device transmitted by the at least one cell tower, the at least one cell tower having a cell identifier (ID) associated with a location stored in the reference database,
      determine a cellular-based location estimate for the WLAN and cellular enabled device based at least in part on the location associated with the cell ID,
      compare the cellular-based location estimate to the WLAN-based location estimate to determine whether a distance between the cellular-based location estimate and the WLAN-based location estimate exceeds a pre-determined threshold, and
      upon the condition that the distance exceeds the pre-determined threshold, infer that the location associated with the cell ID is inaccurate and update the location associated with the cell ID in the reference database, the updated location used in determining resulting location estimates for WLAN and cellular enabled devices.

13. The system of claim 12, wherein the logic configured to determine the cellular-based location estimate comprises logic configured to:
   determine a set of cellular-based location estimates of which the cellular-based location estimate is a member, wherein the WLAN-based location estimate is consistent with at least one other cellular-based location of the set of cellular-based location estimates.

14. The system of claim 12, wherein the location associated with the cell ID is inferred to be inaccurate if the distance is an order of magnitude larger than a coverage area of the at least one cell tower.

15. The system of claim 12, further comprising logic configured to determine the resulting location estimate for each of the WLAN and cellular enabled devices based at least in part on wireless signals received by a respective WLAN and cellular enabled device transmitted by at least one WLAN AP and cellular signals received by the respective WLAN and cellular enabled device transmitted by one or more cell towers.

16. The system of claim 15, wherein the at least one WLAN AP whose wireless signals are received by the respective WLAN and cellular enabled device includes at least one WLAN access point cluster of a plurality of WLAN APs, and wherein the reference database includes a plurality of estimated locations corresponding to an estimated location of a plurality of WLAN APs in the at least one WLAN access point cluster.

17. The system of claim 16, further comprising logic configured to weight the at least one WLAN access point cluster according to a distance from a plurality of estimated locations corresponding to the plurality of WLAN APs in the at least one WLAN access point cluster to a cellular-based location estimate for the respective WLAN and cellular enabled device for use in determining the resulting location estimate for the respective WLAN and cellular enabled device.

18. The system of claim 17, further comprising logic configured to select estimated locations corresponding to the plurality of WLAN APs in the at least one WLAN access point cluster having a distance to the respective cellular-based location estimate that is less than a pre-determined distance for use in determining the resulting location estimate for the respective WLAN and cellular enabled device.

* * * * *

UNITED STATES PATENT AND TRADEMARK OFFICE
CERTIFICATE OF CORRECTION

PATENT NO.        : 9,001,743 B2                    Page 1 of 1
APPLICATION NO.   : 14/160868
DATED             : April 7, 2015
INVENTOR(S)       : Farshid Alizadeh-Shabdiz It is certified that error appears in the above-identified patent and that said Letters Patent is hereby corrected as shown below:

In the Claims:
Claim 5, Col. 14, line 64 should read:
resulting location estimate for the respective WLAN Claim 6, Col. 15, line 4 should read:
the resulting location estimate for the respective WLAN and Signed and Sealed this
Eleventh Day of August, 2015

Michelle K. Lee
*Director of the United States Patent and Trademark Office*